(12) United States Patent
Feraud et al.

(10) Patent No.: US 9,295,927 B2
(45) Date of Patent: Mar. 29, 2016

(54) METHOD AND DEVICE FOR CONTACTING TWO IMMISCIBLE LIQUIDS WITHOUT MIXING THEM

(75) Inventors: Jean-Pierre Feraud, Orange (FR); Jean Duhamet, Bagnols sur Ceze (FR); Florent Gandi, Saint Andre D'Olerargues (FR); Olivier Conocar, Pujaut (FR)

(73) Assignee: COMMISSARIAT A L'ENERGIE ATOMIQUE, Paris (FR)

( * ) Notice: Subject to any disclaimer, the term of this patent is extended or adjusted under 35 U.S.C. 154(b) by 1073 days.

(21) Appl. No.: 12/519,150

(22) PCT Filed: Dec. 19, 2007

(86) PCT No.: PCT/EP2007/064231
§ 371 (c)(1),
(2), (4) Date: Nov. 17, 2009

(87) PCT Pub. No.: WO2008/080853
PCT Pub. Date: Jul. 10, 2008

(65) Prior Publication Data
US 2012/0055874 A1    Mar. 8, 2012

(30) Foreign Application Priority Data

Dec. 21, 2006  (FR) ..................... 06 55829

(51) Int. Cl.
*B01D 11/04*    (2006.01)
*B01D 35/28*    (2006.01)
(Continued)

(52) U.S. Cl.
CPC .............. *B01D 11/04* (2013.01); *B01D 11/043* (2013.01); *B01D 11/0476* (2013.01); *G21C 19/48* (2013.01); *B01D 35/28* (2013.01); *C21C 7/04* (2013.01); *Y02W 30/884* (2015.05)

(58) Field of Classification Search
CPC .. B01D 11/04; B01D 11/0476; B01D 11/043; B01D 11/0434; B01D 35/28; C22B 3/00; C22B 3/02; C22B 3/20; C22B 3/22; C22B 3/42; C21C 7/00; C21C 7/04; F27B 7/00; F27B 7/02; F27B 2007/027; F27B 2007/025
See application file for complete search history.

(56) References Cited

U.S. PATENT DOCUMENTS 2,902,415 A *  9/1959  Niedrach et al. ................ 205/47
3,156,534 A   11/1964  Josephson et al.
(Continued)

FOREIGN PATENT DOCUMENTS

GB       2 127318 A    4/1984

OTHER PUBLICATIONS
International Search Report for PCT Application No. PCT/EP2007/064231 dated Jun. 25, 2008.
(Continued)

*Primary Examiner* — Katherine Zalasky
(74) *Attorney, Agent, or Firm* — Nixon Peabody LLP

(57) ABSTRACT

Method of contacting a first and a second immiscible liquids without mixing them, including: (a) the first liquid is placed in at least one container comprising a wall made of a solid material that is non reactive with the first and second liquids, said wall having one or more through-holes and the first liquid being non wetting vis à vis said solid material of the wall; (b) said first container is immersed in a volume of the second liquid so that the first liquid is in contact with the second liquid at the level of said through-holes; (c) the first liquid is left in contact with the second liquid for a time sufficient for mass exchange, transfer, to take place between the first and second liquids; and (d) said first container is withdrawn from the volume of the second liquid.

26 Claims, 2 Drawing Sheets

(51) Int. Cl.
*G21C 19/48* (2006.01)
*C21C 7/04* (2006.01)

(56) References Cited

U.S. PATENT DOCUMENTS

| | | | |
|---|---|---|---|
| 3,607,107 A | 9/1971 | Ayers | |
| 3,663,178 A | 5/1972 | Miller et al. | |
| 3,703,463 A | 11/1972 | Bhuta et al. | |
| 3,853,979 A | 12/1974 | McNeese et al. | |
| 4,631,127 A * | 12/1986 | Condit, Sr. | 210/232 |
| 4,814,046 A | 3/1989 | Johnson et al. | |
| 5,254,076 A | 10/1993 | Chow et al. | |
| 5,650,053 A * | 7/1997 | Gay et al. | 204/212 |
| 6,365,019 B1 * | 4/2002 | Herrmann et al. | 204/272 |
| 6,630,060 B1 * | 10/2003 | Vaarni et al. | 204/213 |
| 2002/0005357 A1 | 1/2002 | Kondo et al. | |

OTHER PUBLICATIONS

French Search Report for French Patent Application No. FR0655829 dated Oct. 25, 2007.

F.B. Hill, et al., "Axial Mixing and Mass Transfer in Fused Salt-Liquid Metal Extraction Columns", U.S. Atomic Energy Commission Report BNL-791 (T-301), Jan. 1963.

D.D. Sood, "Experimental studies for reprocessing of molten salt reactor fuels", Proceedings of the Symposium on Chemical Reactions in Non-Aqueous Media and Molten Salts, Osmania University, Hyderabad, India, Mar. 6-8, 1978.

Nicolas Eustathopoulos, "Tension superficielle [Surface tension]", Techniques de l'ingénieur M67, Mar. 1999.

Bernard Le Neindre, "Tensions superficielles des composés inorganiques et mélanges [Surface tensions of inorganic compounds and mixtures]", Techniques de l'ingénieur K476-1.

K. Landry et al., "Wettability of carbon by aluminium and aluminium alloys", Materials Science & Engineering A254 (1998), Elsevier, pp. 99-111.

S.W. Ip, et al., "Wettability of nickel coated graphite by aluminium", Material Science & Engineering A244 (1998), Elsevier, pp. 31-38.

E.W. Dewing, et al., "The interfacial tension between aluminium and cryolite melts saturated with alumina", Metallurgical Transactions B, vol. 8B, Dec. 1977, pp. 555-561.

* cited by examiner

METHOD AND DEVICE FOR CONTACTING TWO IMMISCIBLE LIQUIDS WITHOUT MIXING THEM

CROSS REFERENCE TO RELATED APPLICATIONS OR PRIORITY CLAIM

This application is a national phase of International Application No. PCT/EP2007/064231, entitled "METHOD AND DEVICE FOR CONTACTING TWO NON MISCIBLE LIQUIDS WITHOUT MIXING THEM", which was filed on Dec. 19, 2007, and which claims priority of French Patent Application No. 06 55829, filed Dec. 21, 2006.

DESCRIPTION

Technical Field

The invention relates to a method and a device for contacting two immiscible liquids without mixing them.

In particular, the invention relates to a method and a device for contacting molten metals and salts at high temperatures, possibly up to for example 800° C.

The technical field of the invention may be defined in general as that of mass transfer, more particularly that of chemical separation and contacting techniques and more particularly extraction techniques involving immiscible liquids.

The technical field of the invention is more precisely, but not exclusively, that of high-temperature liquid/liquid extraction systems, which are also called pyrocontactors, in which a liquid salt phase and a molten metal phase are brought into contact with each other.

The conventional reprocessing by "hydrometallurgy" of high burn-up nuclear fuels requires cooling times of several years so as to reduce the content of radioactive elements responsible for radiolysis phenomena. High-temperature reprocessing by pyrometallurgy methods has the benefit of a low radiolytic sensitivity and of a fuel cooling time of only a few months.

Pyrocontactors for pyrometallurgical reprocessing by liquid/liquid extraction have thus been described in documents [1], [2], [3], [4] and [5]. In these pyrocontactors, the contacting of the liquid and molten metal phases is generally carried out continuously.

Documents [1-2] describe loosely packed columns (columns with a bulk packing) or a plate column using the bismuth/molten chloride system.

The use of the extraction columns described in the above documents is limited by the exchange kinetics. The HETP (height equivalent of a theoretical plate) of these columns is generally between 1 and 2 m.

Document [3] describes a rotary packing column used in particular for contacting a potassium chloride/aluminium chloride molten salt phase containing plutonium and a uranium-aluminium alloy.

Document [4] describes mixer-settlers, the technology of which, derived from hydrometallurgy, has been especially adapted to the pyrometallurgy field.

The use of these mixer-settlers is limited by the efficiency in the settling-out of two phases of closely similar specific gravities. The large dead (hold up) volume in this type of apparatus also requires the use of large quantities of reactants.

Document [5] describes a centrifugal pyrocontactor for mixing immiscible liquid salts and liquid metals and then separating them. The liquids are introduced into an annular mixing zone and are vigorously mixed using vertical blades fixed to a rotor combined with deflectors. The liquids are introduced into the apparatus at a temperature of 700 to 800° C. and are separated in the rotor into a dense phase and into a light phase, which are removed from the apparatus.

This apparatus is used for treating molten chloride baths resulting from an electrorefining process.

The centrifugal extractor described in the above document is an effective apparatus, but has been tested only over short periods not exceeding a few hundred hours in a molten chloride medium. Its reliability has therefore not been proven over a sufficient time. The use of these apparatuses is also limited by the appearance of corrosion problems that rapidly degrade their operation.

In addition, outside the field of pyrocontactors and the nuclear industry, documents [6] and [7] describe the separation of immiscible liquids, especially within the context of extracting oil contained in water.

These techniques employ complex apparatuses equipped with metal screens and pumping systems with the aim of performing a simple physical separation of two fluids without any purpose of selectively extracting dissolved compounds.

In view of the foregoing, there is therefore a need for a method and a device for contacting two immiscible fluids, such as a pyrocontactor, which is simple, reliable, safe and easy to implement. There is also a need for such a method and such a device that can be used with a large variety of liquids, especially with molten salts and metals, very efficiently and with optimum kinetics.

Finally, there is a need for a method and a device for contacting immiscible fluids that limits the accelerations to which the fluids are subjected and requires only a limited number of moving parts.

One goal of the invention is to provide a method and a device for contacting two immiscible liquids that meet inter alia these requirements.

Another goal of the invention is to provide such a method and such a device that do not have the drawbacks, defects, limitations and disadvantages of the methods and devices of the prior art and which solve the problems of the methods and devices of the prior art.

These goals and yet others are achieved in accordance with the invention by a method of contacting a first and a second immiscible liquids without mixing them, in which the following successive steps are carried out:

a) the first liquid is placed in at least one container comprising a wall made of a solid material that is non reactive with (vis à vis) the first and second liquids, said wall having one or more through-holes and the first liquid being non wetting vis à vis said solid material of the wall;

b) said first container is immersed in a volume of the second liquid so that the first liquid is in contact with the second liquid at the level of said through-holes;

c) the first liquid is left in contact with the second liquid for a time sufficient for mass exchange, transfer, to take place between the first and second liquids; and d) said first container is withdrawn from the volume of the second liquid.

Preferably, the densities of the first and second liquids are similar.

The term "similar densities" is understood in general to mean that the two densities of the first and second liquids differ by no more than 10%, preferably by no more than 5% and even more preferably by no more than 1%.

The first liquid is non wetting vis à vis the material of the wall (does not wet the material of the wall), which means in general that its angle of contact $\theta$ with said wall is greater than 90° and is preferably between 120° and 180°.

The second liquid may or may not be wetting, but preferably it should be rather wetting with respect to the material of the separating wall.

The method according to the invention is simple, reliable and easy to implement. It meets the needs and requirements listed above and provides a solution to the problems of the prior art mentioned above.

The method according to the invention may be implemented easily, whatever the nature of the contacting liquids and the temperature, for example when they are molten salts or metals.

The method according to the invention is efficient and involves minimum movements, transfers of the two liquids. The method according to the invention may be carried out in a relatively short period, for example between 3 and 24 hours, since the contacting area of the apertured (cut out) crucibles enables thermodynamic equilibrium to be achieved in a short time.

In particular, the sufficient duration of the contacting of step c) may be easily determined by the man skilled in this technical field and is generally from 2 to 10 minutes, and may for example be up to 1 hour.

The method according to the invention may just as well be carried out in a batch operating mode as in a continuous operating mode.

Preferably, according to the invention, the first liquid/second liquid/solid wall material interfacial tension is high.

Advantageously, the first liquid/second liquid/solid wall material interfacial tension is greater than 0.3 N/m, preferably greater than 0.6 N/m.

Furthermore, advantageously, the first liquid has a surface tension of greater than 0.3 N/m, preferably greater than 0.8 N/m.

Such a high surface tension enables the first liquid to be retained in the containers when they are being moved, out of the second liquid and prevents any loss of liquid by capillary flow out of the containers.

It is thus possible to work with through-apertures, through-holes with characteristic dimensions of the order of one millimeter.

The first liquid may consist of a pure metal or of an alloy of several metals in the molten state.

Said metal(s) may be chosen for example from aluminium and copper.

Especially in the case in which the first liquid consists of one or more molten metals, the second liquid may consist of a molten salt or a mixture of several molten salts.

As examples, these molten salts are generally chosen from: alkali metal chlorides, alkaline-earth metal chlorides and aluminium chlorides, such as for example $LiCl$ and $AlCl_3$; and alkali metal fluorides, alkaline-earth metal fluorides and aluminium fluorides, such as for example $LiF$ and $AlF_3$.

An $LiCl/AlCl_3$ mixture or an $LiF/AlCl_3$ mixture may for example be employed.

The first liquid may also be chosen from water and water/alcohol solutions and the second liquid may be chosen from paraffin oils.

After the final step d) of the method according to the invention, steps b) to d) may be repeated, that is to say the container is then again immersed in a volume of a third liquid, which is different from the second liquid.

The mass transfer (or exchange) carried out during step c) may be any mass transfer operation that may take place between two liquids, preferably said mass transfer is a liquid/liquid extraction during which one of the constituents of the second liquid passes into the first liquid and/or one of the constituents of the first liquid passes into the second liquid.

In particular when a liquid/liquid extraction is performed, said first liquid may be molten aluminium and the second liquid may comprise molten fluoride salts containing aluminium fluoride, in which salts one or more actinide fluorides and one or more lanthanide fluorides are dissolved; and, during step c), said actinide fluorides, by being in contact with the molten aluminium, are chemically reduced to said actinides (in metal form), which consequently pass into solution in the first liquid, whereas the lanthanide fluorides (which are not reactive) remain in the second liquid.

After step d), steps b) to d) may then be repeated by immersing said first container(s) containing the molten aluminium and actinides (metals) in a volume of a third liquid consisting of one or more molten alkali metal or alkaline-earth metal chlorides containing aluminium chloride, by means of which the actinides, by being in contact with said molten fluorides, are chemically oxidized to actinide chlorides, which pass into the third liquid (in the oxidized form of chlorides), and the molten aluminium is regenerated and may possibly be reused for a new extraction/back-extraction cycle.

Step b) of the method of the invention is preferably carried out in a rough vacuum ranging from $2 \times 10^{-2}$ to $10^{-1}$ mbar absolute during the contacting of the two liquids, thereby guaranteeing "intimate" contact between the two liquids, i.e. said gas pocket possibly lying between the two phases is thus eliminated.

Step c) of the method according to the invention is then carried out, preferably in an inert gas atmosphere, such as an argon atmosphere, preferably at a pressure close to atmospheric pressure, in particular so as to prevent the molten salt from evaporating.

The invention furthermore relates to a device for implementing the method as described above, this device comprising:

one or more first containers intended to hold a first liquid and comprising a wall made of a solid material that is non reactive with (vis à vis) the first and second immiscible liquids, said wall having one or more through-holes, the first liquid being non wetting vis à vis said solid wall material;

a second container intended to hold a volume of a second liquid; and means for supporting the container(s) containing the first liquid so as to immerse them in said volume of the second liquid and, thereafter, to withdraw them from the volume of the second liquid.

The device according to the invention has all the advantages and effects associated with implementing the method according to the invention. It is especially simple and reliable and has a minimum number of moving parts for maximum efficiency. Its energy consumption is minimal. It may be designed so as to be easily operated remotely, so as to be used in nuclear containment vessels, for example of the shielded chamber type.

Said container or containers are generally made of a material chosen according to its withstand properties under the experimental conditions and to its non-wettability with respect to (vis à vis) the first liquid. They may thus be made of a material chosen from graphite and boron nitride.

The container(s) may have the form of cylinders of circular cross section having side walls and a base or bottom wall. Preferably, this bottom has a rounded geometry so as to avoid the presence of dead volumes, permitting the second liquid to diffuse beneath the first liquid, in other words so as to limit any accumulation of the second liquid.

Said holes or apertures have a cross-sectional shape which may be chosen from circles and polygons, such as squares, rectangles, particularly rectangles having a high length/width ratio.

A preferred shape of said holes, especially in the case in which the first containers are cylindrical containers, is that of slots made in the bottom of said containers, these extending along the side walls of said containers.

The means for supporting said first containers, for immersing them in said volume of the second liquid and for withdrawing them from said volume of second liquid may comprise a vertical rod to the bottom end of which an element supporting the first containers is fixed.

Said element supporting the first containers may be in the form of a circular carousel or barrel, having a central axis lying along the extension of said vertical rod, said containers being arranged in a circle concentric with the central axis of said carousel or barrel.

Said container(s) may be fixed to the container support element by any known means, such as keys.

Advantageously, said support element of the first containers may comprise, at its centre, a piece preferably of cylindrical shape projecting downwards beyond the base of said first containers and making it possible to control the immersion depth, to limit the dead volume in the container that contains the second liquid and finally to provide a cold spot so as to permit movement of the second liquid by thermal convection.

If said first and second (third) liquids have to be heated, the device is placed in a furnace, for example a furnace of the shaft type ("four de type puits"), and the upper end of the vertical rod preferably lies outside the furnace, so as to allow it to be manipulated, and possibly thus forming a cold source.

The invention will now be described, in the following detailed description, especially in relation to particular embodiments, with reference to the appended drawings in which.

Figure 5:
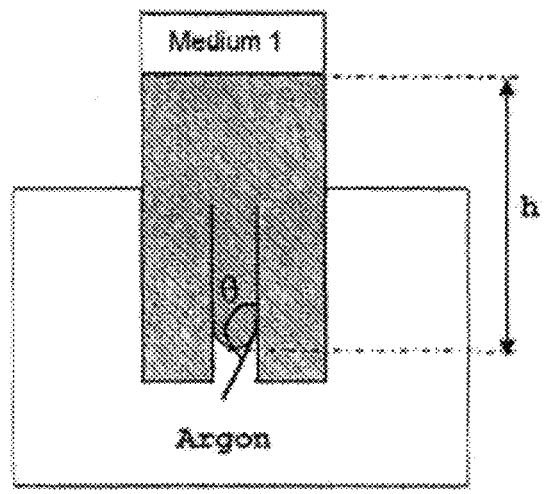
Figure 6:
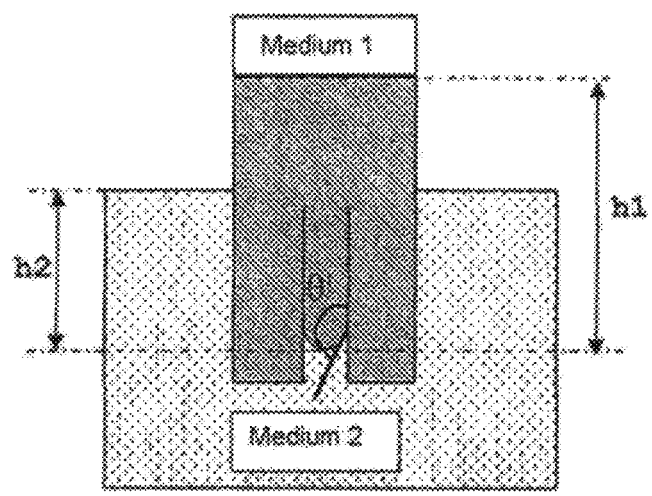

FIG. 5 is a schematic sectional view showing the contact angle θ of the "triple point" defined between the first liquid (medium 1), the gaseous atmosphere within the furnace, such as argon, and the solid wall of one of the perforated (cut out) baskets at one of the slots in this basket; and FIG. 6 is a schematic sectional view showing the contact angle θ' at the triple point defined between the first liquid (medium 1), the second liquid (medium 2) and the solid wall of one of the perforated (cut out) baskets at one of the slots in this basket.

Figure 1:
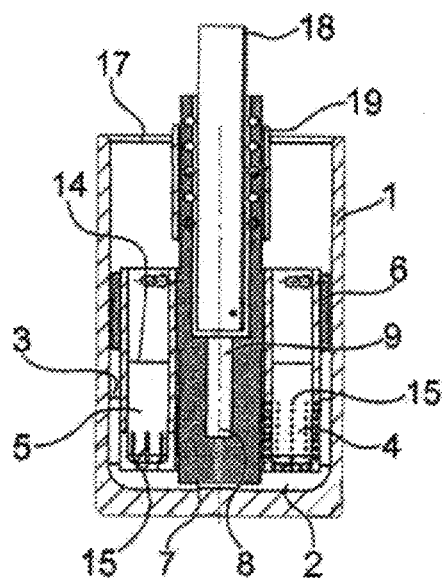
FIG. 1 is a sectional side view of a device according to the invention such as a pyrocontactor, comprising perforated (cut out) baskets immersed in a liquid medium, such as molten salts.

The device shown in FIG. 1 firstly comprises a container, crucible (1) made of a material such as graphite, boron nitride or another such material when contacting of high temperature liquids is carried out.

This crucible (1) is intended to hold one of the liquids (the second liquid (2)) which may consist of a molten salt or a mixture of molten salts.

These molten salts may be especially molten chlorides or fluorides.

The device of FIG. 1 may especially be used for the grouped extraction of actinides, such as uranium, plutonium, americium and curium, that are contained in a molten fluoride solution and are reduced to their metallic form upon contact with molten aluminium metal contained in the perforated baskets.

The second liquid, such as the molten salt(s), rises up to a level (3) in the crucible (1).

When it operates with molten salts and metals, the device as described in FIG. 1 is then placed in a heating apparatus, such as a furnace (not shown).

The device according to the invention in the embodiment shown in FIG. 1 comprises several apertured (cut out), perforated baskets (4) that contain the "first" liquid (5) that has to come into contact with the second liquid (2) contained in the crucible (1).

These apertured or perforated baskets (4) are fixed to a support element, which may be called a carousel or barrel (6).

Figure 3:
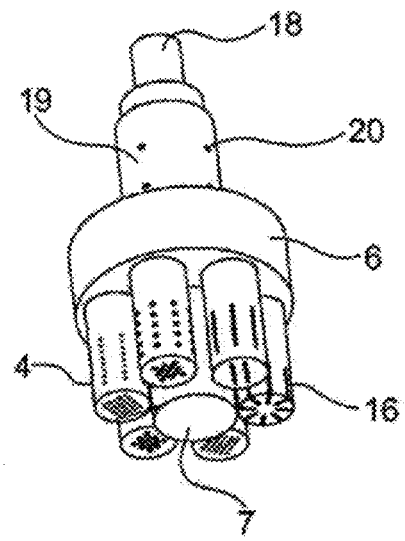
FIG. 3 is a perspective view of the barrel, carousel of the device of FIG. 1, equipped with six perforated (cut out) baskets having apertures of different geometries.
Figure 2:
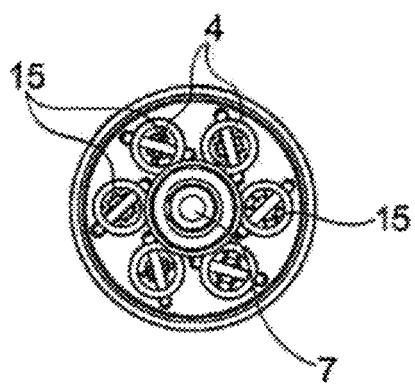
FIG. 2 is a top view of the barrel, carousel of the device of FIG. 1, equipped with six perforated (cut out) baskets.

In FIGS. 2 and 3, the carousel, barrel (6) supports six apertured (cut out) or perforated baskets (4), but of course a different number of baskets, whether greater or fewer, may be provided.

Such a carousel can support for example 1 to 6 baskets, and it is then necessary to replace the one or more unused baskets with a corresponding number of baskets made of solid material (graphite, etc.) so as to retain the properly controlled liquid heights and exchange surfaces.

The baskets-supporting carousel, barrel (6) also has a central piece or part (7) which in FIG. 1 is shown immersed in the second liquid, such as a molten salt placed inside the crucible. This central part (7), generally of cylindrical shape, projects beyond the base of the containers, baskets (4).

The barrel, carousel system illustrated enables the type and nature of the perforated baskets, each of which is supported by a simple key, to be rapidly changed.

The central piece or part (7) of the carousel (6) is bored (8) and may optionally accommodate a thermocouple and/or a thermal bridge.

For these purposes, a metal rod (9) may thus be placed in this bored central part (8) of the carousel, barrel (6).

The central piece or part of the perforated baskets support, or barrel or carousel (6), is therefore immersed in the "second" liquid, such as molten salts, so as to locally cool the liquid by a few degrees.

This technical feature lowers the temperature in a controlled manner using the physical, geometric and insulation characteristics of the metal rod (9) positioned in the bore (8) of the central part of the support. The rod (9) and the projecting central part (7) thus create a thermal bridge between the inside and the outside of the furnace. This results in a temperature gradient between the cooler central part of the second liquid and the hotter edge of the crucible, since the latter is in contact with the furnace, thereby creating a free convection current. The convection currents are greater the higher the temperature gradient and the lower the thermal conductivity of the liquid medium formed by the second liquid.

The existence and the control of the free convection currents help to improve the mass transfer between the two liquid phases (the first and second liquids) in contact with each other, by renewal of the interface.

Thus, the kinetics (rate) of contacting between the two phases, for example the kinetics (rate) of extraction, is no longer limited by the sole diffusion phenomenon.

The immersed central part (7) also has the benefit of reducing the "dead" (hold up) volume in the crucible containing the second liquid, such as molten salts. In such a design it is possible to obtain a perforated baskets/crucible volume ratio close to 1.

The central part (7) also provides a safety stop and controls the height at which the carousel is positioned in the temperature system, that is to say in the system heated to the working temperature which is in particular a temperature ensuring that the metal and salts phases of each of the respective liquids are in the molten state.

By modifying the geometry of the immersed central part (7) it is possible to change the volume or mass ratio of the contacting phases and to optimize the operating conditions of the method.

To give an example, the immersed central part (7) of the barrel or carousel may have a polygonal or star geometry.

The assembly formed by the barrel, carousel and the apertured, perforated (cut out) baskets is held in place on the rod (18) using pins.

The top part of the carousel penetrates the annular space of the inconel rod (18) and (19) and is thus kept in a fixed position.

The rod, which may be termed the lifting rod, with which the furnace, such as a shaft furnace ("four puits") (pot furnace), in which the device according to the invention is placed, is equipped, is used to lift and move the carousel and the baskets fixed to it so as to immerse it in different liquid media, for example various molten salt solutions.

The rod (18) (19) for supporting the assembly formed by the barrel and the baskets may be connected to a remote rotation system, which thus enables the liquid medium contained in the crucible to be dynamically stirred. By carrying out such stirring, the efficiency of the apparatus is increased.

The perforated baskets (4), as shown in FIG. 3, have generally a cylindrical shape, generally with a circular cross section, with an open top (10), and the lower wall or bottom (11) of said baskets is preferably machined so as to be rounded on the inside (12), which avoids any dead volume and consequently prevents the second liquid from accumulating.

In other words, the side walls (3) of the basket (4) are joined to the bottom (11) of the latter via a rounded wall part. The perforated (cut out) baskets may however also be closed in their top part so as to avoid any contamination of the liquid contained therein up to a level (14), such as a molten metal, by any vapour and condensates coming from the second liquid phase, for example of molten salts, contained in the "lower" crucible.

The baskets may also be closed off at the top by solidification of the liquid contained in the baskets.

The wall and the bottom of the baskets are, in accordance with the invention, made of an inert material that is not reactive to (vis à vis) the two liquids. If the liquid phase inside the baskets (i.e. the first liquid) consists of a liquid metal and the liquid phase within the crucible (the second liquid) consists of molten salts—for example in the case of extraction by contact between molten Al and molten fluorides, followed by back-extraction by contact between molten Al and molten chlorides—the chosen material may be graphite.

For chemical resistance reasons, said material may also be coated with a protective layer of pyrocarbon (pyrolytic carbon) or boron nitride.

Of course, if two liquids that have not been brought to a high temperature are contacted, then the choice of materials for the wall of the baskets is much broader: it could in particular be made of glass, pyrex, or even polymer materials chosen in particular according to their hydrophilicity or lipophilicity.

The condition for low wettability of this material by the first (contained) liquid or liquid 1, expressed by an angle θ greater than 90°, must of course be respected.

In general, the device according to the invention based on the implementation of apertured, perforated (cut out) baskets may be used within wide temperature ranges, for example from ambient temperature up to 1000° C., or even beyond, by choosing suitable materials.

In accordance with the invention, the walls (including the bottom) of the basket(s) are provided with holes, apertures (15), at which the contacting takes place, without mixing, between the first liquid phase, contained inside the perforated, pierced or apertured (cut out) baskets, and the second liquid phase, which is outside these baskets in the crucible.

The number, position, geometry and size of the apertures (15) in the baskets may be modified so as in particular to adjust the contact area between the two liquid media. For example, these modifications may improve the exchange kinetics for a liquid/liquid extraction process. Other geometric modifications may be made to limit liquid retention in the perforated baskets, at their apertures, during medium change-over operations in the extraction and back-extraction steps.

In particular in the case of cylindrical baskets, the apertures may have, in cross section, the form of circles, squares or polygons, such as rectangles, preferably elongate rectangles, i.e. slots. These apertures may be provided in the side walls, and on the bottom of the containers, such as cylinders as well.

Various shapes that these holes or apertures can assume are visible in FIGS. 2 and 3 in which the six baskets supported by the carousel each have apertures differing in shape and in number.

It is obvious that all the baskets may have the same shape and same number of apertures for the sake of facilitating manipulation and movement thereof.

For example, as regards the size of the apertures in the case of cylindrical baskets, for example with a height of 100 mm and a diameter of 21.5 mm, the circular apertures will have a diameter of 1 mm and the slots will have a length of 19 mm and a width of 1 mm.

Figure 4:
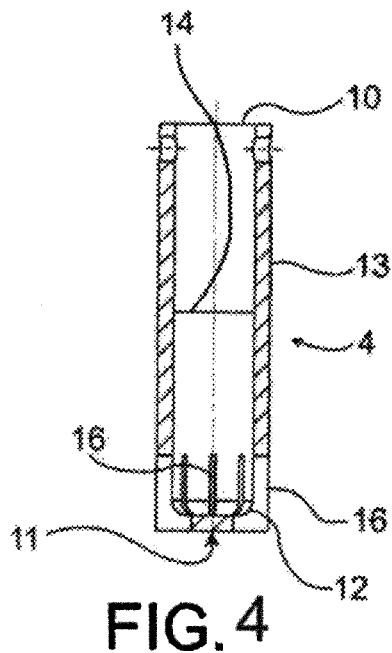
FIG. 4 is a sectional side view of one of the perforated baskets of the carousel, barrel of FIGS. 1, 2, 3.

Among the many possible geometries, the shape of the basket apertures shown in FIG. 4, which consist of perforated slots, windows (16) with for example a width of 1 mm starting in the base wall of the basket with for example a gap of 0.8 cm from the edge and going for example up to 15 mm in height on the side wall (13) (for cylindrical baskets having for example a height of 100 mm and a diameter of 21.5 mm), enables the gas bubbles to be discharged during the operation of contacting the two molten media in a controlled atmosphere.

This particular configuration of the apertures is an improvement over apertured, perforated (cut out) baskets having apertures of simple shape, such as circles.

The implementation of the method according to the invention is facilitated when one of the two liquids, preferably the one inside the perforated baskets, has a high surface tension, namely a surface tension greater than 0.3 N/m, this being the case for example for molten aluminium at 933 K [8] which has a surface tension of 0.87 N/m.

It should be recalled that the surface tension is that at the surface of the liquid, or rather at the interface between said liquid and the gaseous atmosphere within the furnace.

This surface tension is defined as the force that has to be applied per unit length along a line perpendicular to the surface of a liquid in equilibrium so as to extend this surface, or is defined as the work exerted by this force per unit area. The unit of surface tension (N/m) is equivalent to joules per square meter ($J/m^2$), corresponding to a surface energy unit.

Such a characteristic is important as it makes it possible to retain the first liquid in the baskets, without any loss, flow, during movements of the baskets (by them being lifted by the metal rod of the furnace, described above) in the atmosphere, for example argon atmosphere, of the furnace between the immersions in the various liquid media, such as molten salts, used for example to carry out the steps for extracting the actinides present in the fluoride solutions, followed by respective back-extraction in molten chloride media.

The maximum hydrostatic head corresponds to the maximum height of the column of the first liquid that can be accommodated in a perforated basket used according to the invention, this hydrostatic head being in particular dependent on the geometry of the holes or apertures of said basket.

The maximum hydrostatic head may be calculated in two cases: the first is that in which the baskets are raised, i.e. not immersed, and in which the first liquid or liquid 1 such as molten Al contained in these baskets is in contact with the gas, such as argon, constituting the atmosphere of the furnace.

The second case is that in which the perforated baskets are lowered, i.e. immersed in the second (or third) liquid such as molten salts.

This maximum hydrostatic head may be calculated in the first case using the Young-Laplace equation, which may be termed the simplified Young-Laplace equation, involving the surface tension at the surface of the liquid or rather at the interface between liquid 1 contained in the basket, such as molten aluminium, and the gaseous atmosphere within the furnace during the steps of lifting and moving the baskets. This atmosphere consists for example of a rough vacuum or of argon (FIG. 5).

The simplified Young-Laplace equation is given below [9] (Equation 1):

$$\rho g h = \frac{2\gamma}{r} \cos\theta \quad \text{(Equation 1)}$$

where:
- $\rho$: density of the first liquid in kg/m$^3$;
- g: 9.81 m/s;
- h: liquid height in m;
- $\gamma$: liquid surface tension in N/m (or J/m$^2$);
- r: radius of the capillary or distance between two parallel plates; and
- $\theta$: contact angle of the liquid interface with the solid wall (parallel plates or capillary, depending on the shape of the apertures).

Equation 1 is used to calculate apertures of perforated baskets enabling various heights of the first liquid, for example molten Al, to be contained without back-pressure of a liquid, such as a molten salt.

Examples of aperture geometries are given in Table 1 below in the case of Al contained in a graphite crucible, taking into account an interfacial tension of 0.87 N/m.

TABLE 1

| | Circular geometry | | Window (parallel plates) geometry | | | |
|---|---|---|---|---|---|---|
| Molten metal | Al | Al | Al | Al | Al | Al |
| Crucible | 1 | 2 | 3 | 4 | 5 | 6 |
| Density in kg/m$^3$ | 2700 | 2700 | 2700 | 2700 | 2700 | 2700 |
| Contact angle $\theta$/graphite | 140° | 140° | 140° | 140° | 140° | 140° |

TABLE 1-continued

| | Circular geometry | | Window (parallel plates) geometry | | | |
|---|---|---|---|---|---|---|
| Radius of the hole/or slot depth (width) | 0.05 cm | 0.10 cm | 0.10 cm | 0.05 cm | 0.10 cm | 0.10 cm |
| $\Delta h$ according to eq. 1 | 10.0 cm | 5.0 cm | 5.0 cm | 10 cm | 5.0 cm | 5.0 cm |

The heights given in Table 1 were calculated using Equation 1.

Here, only the absolute value of $\Delta h$ is important, thereby making it conceivable to work with liquid columns of between 5 and 10 cm.

This is because the analytical calculation gives negative $\Delta h$ values, since aluminium does not wet graphite.

In the case of the Al/graphite system, these results must be considered as guide values. This is because the contact angle between Al and a carbon-containing matrix is difficult to measure since Al rapidly reacts with the support and the oxygen impurities, forming Al carbides and oxides [10, 11].

Considering the second case, when the baskets containing the first liquid such as molten Al are immersed in a second (or third) liquid, such as a bath of molten salts, the metal/salt/solid interfacial tension property replaces the metal/gas/solid surface tension property.

The new value of the contact angle $\theta'$ to be used for the calculation must also take into account this new triple point, as shown in FIG. 6.

Finally, it is necessary to balance the hydrostatic pressures at the triple point according to Equation 2 below:

$$\rho_2 g h_2 - \rho_1 g h_1 = \frac{2\gamma_{12}}{e} \cos\theta' \quad \text{(Equation 2)}$$

where:
- $\rho$: density in kg/m$^3$ ($\rho_1$=density of for example Al and $\rho_2$=density of for example molten salt);
- g: 9.81 m/s;
- h: liquid height in m ($h_1$=Al height for example and $h_2$=molten salt height for example);
- $\gamma_{12}$: interfacial tension, for example salt/metal/solid support interfacial tension, in N/m (or J/m$^2$);
- e: radius of the capillary or distance between two parallel plates (in m); and
- $\theta'$: contact angle of the liquid interface with the solid wall (parallel plates or capillary).

In the case of implementing an Al/molten fluoride system, $\rho_1 \# \rho_2 \# \rho$, and by taking $h_2 = h_1 + \Delta h$, Equation 2 becomes:

$$\Delta h = \frac{2\gamma_{12}}{\rho g e} \cos\theta' \quad \text{(Equation 3)}$$

In the case given above, it is possible to calculate the limiting hydrostatic head of Al contained in the apertured, perforated (cut out) baskets as a function of each aperture geometry. A few examples are given in Table 2 below, taking a $\gamma_{12}$ value of 0.460 N/m at 1000° C. [12] for Al in contact with NaF/AlF$_3$ in a solid alumina support:

TABLE 2

Effect of the aperture geometry on the limiting hydrostatic head

| | Circular geometry | | Window (parallel plates) geometry | | | |
|---|---|---|---|---|---|---|
| Molten metal | Al | Al | Al | Al | Al | Al |
| Crucible | 1 | 2 | 3 | 4 | 5 | 6 |
| Density $\rho_1$ in kg/m$^3$ | 2700 | 2700 | 2700 | 2700 | 2700 | 2700 |
| Contact angle $\theta$/alumina (*) | 180° | 180° | 180° | 180° | 180° | 180° |
| Radius of the hole/or separation between plates | 0.05 cm | 0.10 cm | 0.10 cm | 0.05 cm | 0.10 cm | 0.10 cm |
| $\Delta h$ (Equation 2) | 6.95 cm | 3.47 cm | 3.47 cm | 6.95 cm | 3.47 cm | 3.47 cm |

When a given material is used, it is necessary to make the best compromise between hydrostatic head, i.e. the amount of material to be treated, and the exchange area of the apertured, perforated (cut out) baskets, i.e. the transfer efficiency.

Likewise, as the extraction progresses, if the contacting operation consists of an extraction, changes in the density of the liquid (due to the mass transfer) contained in the baskets are observed. This phenomenon must be taken into account when designing, proportioning the apertures of the perforated baskets.

The method and the device according to the invention as described above, for example the device as described in FIGS. 1 to 4, may be implemented so as to carry out any mass transfer operation between two liquids.

This operation may in particular be a liquid/liquid extraction operation and more particularly a high-temperature liquid/liquid extraction operation. The method will then be referred to as a pyrometallurgical method and the apparatus according to the invention will then be called a pyrocontactor.

This pyrometallurgical method and this pyrocontactor are applicable in particular in the field of reprocessing spent nuclear fuel.

Thus, the pyrocontactor is used for the grouped extraction of actinides contained in a solution of molten fluorides such as LiF/AlF$_3$.

The contacting between the molten salts, for example LiF/AlF$_3$, and the apertured, perforated (cut out) baskets, containing a molten metal such as molten aluminium, enables the actinides initially in their fluoride form to be chemically reduced to their metallic form and recovered from the aluminium phase.

The contact time between the two liquid phases is between a few minutes and a few hours. The pyrocontactor prevents any mixing between the salt and metal phases. When the two liquid phases are in thermodynamic equilibrium, it is then possible to lift the carousel so as to position the baskets in a second salt medium (third liquid), for example an LiCl/AlCl$_3$ medium, for carrying out the actinide back-extraction step.

Following this second contacting operation, the pyrocontactor may again be positioned in the initial salt bath containing a new charge of fuel to be reprocessed.

The liquid, such as liquid Al, placed in the apertured, perforated (cut out) baskets may be recycled after the back-extraction step. Thus, the basket system acts as a "chemical" pump since the extracting compound is never consumed in the process. This "chemical" pump is used to extract and reconstitute (restore) one or more compounds in solution without using a gravitational or acceleration field as is the case when a settling or centrifugation step is carried out in order to separate the contacting phases. This feature makes it easier to carry out the extraction and represents a real advantage for high-temperature processes.

By controlling the thermal environment of the apparatus it is also possible to improve the kinetics of extraction by installing a means of stirring the solution by controlled free (non-forced) convection. Specifically, the free convection may be controlled by installing a cold source at (7) and/or (9).

The geometry of the proposed system (see FIG. 1) makes it possible, for example, for it to be fitted in practice into a shaft furnace (not shown).

The crucible containing the second liquid, such as molten salts, may be closed in its upper part by an insulating cover (17). This cover (17) is penetrated ("crossed through") by a doubly jacketed rod seen in cross section at (18) and (19). Provided on the penetration of the cover are holes (20) for fastening onto the outer jacket of the rod (19) which make it possible to position the whole pyrocontactor carousel assembly at a certain height by means of keys.

The device according to the invention as described for example in FIG. 1 may operate in discontinuous mode particularly well suited for use in a shielded chamber (box) with small amounts of materials (for example 100 to 1000 g of molten salts and molten metal). However, it would be possible to use larger amounts provided that modifications are made that enable continuous operation to take place.

The invention will now be described with reference to the following examples, given by way of illustration but implying no limitation.

EXAMPLES

Example 1

The extraction apparatus shown here, and described above in relation to FIGS. 1 to 4, was used during trials carried out on recovering neodymium (Nd) from NdF$_3$ in solution.

The operating mode consisted in dissolving 10 g of NdF$_3$ in 300 g of LiF/AlF$_3$.

The salt mixture thus obtained was placed in the graphite crucible of 1 liter capacity and then melted in a shaft furnace at a temperature of 700 to 800° C.

Regarding the extracting medium, 100 g of Al were placed in the six apertured, perforated (cut out) baskets of 0.14 liter capacity, the aperture geometries of said baskets corresponding to FIG. 3, and were vacuum-melted above the salt at 800° C.

The contact between molten metal and salt media then took place in a rough vacuum, before argon blanketing the inside of the furnace at atmospheric pressure so as to avoid any excessive evaporation of the salt.

For this trial, the extraction time was 24 hours of contact between the two media.

After these 24 hours, the carousel support containing the six baskets was raised slowly at a rate of 10 cm every ½ hour so as to allow the molten salt to fully drip into the melting zone of the furnace.

Once the solidification zone, above 20 cm, had been reached (i.e. after 1 hour of raising), the system (FIG. 3) was positioned in the upper part of the furnace so as to allow the perforated baskets to cool.

The rate at which the assembly cooled was able to be accelerated by flushing it with argon at 20° C. at the top of the raised pyrocontactor.

The amount of neodymium extracted by the aluminium, and determined by X-ray diffraction, was between 1 and 2 wt %.

Thus, this trial on the pyrocontactor according to the invention made it possible to achieve the theoretical neodymium distribution coefficient (Kd=0.3) and consequently to validate the aperturred-perforated (cut out) basket technology, whatever the geometry of the apertures, windows involved.

Example 2

Three experiments involving melting/cooling cycles carried out on the aluminium contained in apertured, perforated (cut out) baskets were also necessary to check the possibility of moving the carousel out of the salt without loss of aluminium.

These experiments were carried out on crucibles containing aluminium with Al heights 10% below the maximum heights calculated from Equation 1 depending on the aperture geometry.

The Al heights thus employed were between 1.5 and 8 cm. The weight loss measurements carried out on each crucible demonstrated weight changes of around 0.5%. This good result confirmed the possibility of keeping the liquid aluminium in an argon atmosphere, without hydrostatic backpressure of a molten salt.

After the three melting/cooling cycles, no damage to the aluminium-containing crucibles was observed. The design of the system was therefore such that it allows a good mechanical behaviour faced with the problems of differential expansion of the materials (thermal cycles).

These results confirmed the good general behaviour of the pyrocontactor and the possibility of manipulating this system at high temperature, just as at ambient temperature, without deterioration of the apparatus nor loss of aluminium.

REFERENCES

[1] F. B. Hill and L. E., Kukaka, "Axial mixing and mass transfer in fused salt-liquid metal extraction column", USAEC Report BNL-791, 1963.

[2] D. D. Sood, "Experimental studies for reprocessing of molten salt reactor fuels", Proc. Symp. Chemical reactions in non-aqueous media and molten salts, Osmania University, Hyderabad, India, 6-8/03/1978.

[3] P. R. Josephson and L. Burkhart, "Apparatus for treatment of molten material", US-A-3 156 534 filed on Oct. 11, 1964.

[4] W. E. Miller, J. B. Knighton and G. J. Bernstein, "Mixer settler apparatus", US-A-3 663 178 (1972).

[5] L. S. Chow and R. A. Leonard, "Centrifugal pyrocontactor", US-A-5 254 076 (1993).

[6] G. Pravin, "Surface tension method of and apparatus for separating immiscible liquids", US-A-3 703 463, November 1972,

[7] Majer Denis John, "Improvements relating to apparatus for separating two immiscible liquids", GB-A-2 127318 filed on Nov. 4, 1984.

[8] N. Eustathopoulos, "Tension superficielle [Surface tension]", Techniques de l'ingénieur M67, 03/1999.

[9] B. Le Neindre, "Tensions superficielles des composés inorganiques et mélanges [Surface tensions of inorganic compounds and mixtures]", Techniques de l'ingénieur K476-1.

[10] K. Landry et al., "Wettability of carbon by aluminium and aluminium alloys", Material Science & Engineering A254 (1998), pp. 99-111.

[11] S. W. Ip, R. Sridhard and J. M. Toguri, "Wettability of nickel coated graphite by aluminium", Material Science & Engineering A244 (1998), pp. 31-38.

[12] E. W. Dewing and Paul Desciaux, "The interfacial tension between aluminium and cryolite melts saturated with alumina", Metallurgical Transactions B, Volume 8B, December 1977, pp. 555-561.

The invention claimed is:

1. Method of contacting a first and a second immiscible liquid in a device comprising:
   one or more first containers intended to hold the first immiscible liquid and comprising side walls and a base, said side walls and said base being made of a solid material that is non-reactive with the first and second immiscible liquids, each said wall having one or more through-holes, the first immiscible liquid being non-wetting vis à vis said solid material;
   a second container intended to hold a volume of the second immiscible liquid; and
   means for supporting the one or more first containers containing the first immiscible liquid so as to immerse the one or more first containers in said volume of the second immiscible liquid in the second container and, thereafter, to withdraw the one or more first containers from the volume of the second immiscible liquid in the second container,
   wherein said means for supporting said one or more first containers comprises a vertical rod having a bottom end, wherein an element supporting the one or more first containers is fixed to the bottom end of the vertical rod, and wherein said element supporting the one or more first containers is in the form of a circular carousel or barrel, the circular carousel or barrel having a central axis lying along an extension of said vertical rod and the circular carousel or barrel comprises, at the central axis, a piece projecting downwards beyond the base of said one or more first containers, said one or more first containers being arranged in a circle concentric with the central axis;
   in which the following successive steps are carried out:
   a) the first immiscible liquid is placed in said one or more first containers;
   b) said one or more first containers is immersed in a volume of the second immiscible liquid in the second container so that the first immiscible liquid is in contact with the second immiscible liquid at said one or more through-holes;
   c) the first immiscible liquid is left in contact with the second immiscible liquid for a time sufficient for mass exchange or mass transfer, to take place between the first and second immiscible liquids; and
   d) said one or more first containers is withdrawn from the volume of the second immiscible liquid in the second container.

2. Method according to claim 1, in which the first and second immiscible liquids have similar densities.

3. Method according to claim 2, in which the densities of the first and second immiscible liquids differ by no more than 5%.

4. Method according to claim 1, in which a first immiscible liquid/second immiscible liquid/solid material interfacial tension is greater than 0.3 N/m.

5. Method according to claim 4, in which the first immiscible liquid/second immiscible liquid/solid material interfacial tension is greater than 0.6 N/m.

6. Method according to claim 1, in which the first immiscible liquid has a surface tension of greater than 0.3 N/m.

7. Method according to claim 1, in which the first immiscible liquid consists of a pure metal or of an alloy of several metals in the molten state.

8. Method according to claim 7, in which said pure metal or said alloy of several metals is chosen from aluminium and copper.

9. Method according to claim 7, in which the second immiscible liquid consists of a molten salt or a mixture of several molten salts.

10. Method according to claim 9, in which said molten salt or said mixture of molten salts are chosen from: alkali metal chlorides, alkaline-earth metal chlorides, aluminium chlorides, alkali metal fluorides, alkaline-earth metal fluorides, and aluminium fluorides.

11. Method according to claim 1, in which the first immiscible liquid is chosen from water and water/alcohol solutions and the second immiscible liquid is chosen from paraffin oils.

12. Method according to claim 1, in which, after step d), steps b) to d) are repeated by immersing said one or more first containers in a volume of a third liquid, which is different from the second immiscible liquid.

13. Method according to claim 1, in which said mass transfer between the first and second immiscible liquids is a liquid/liquid extraction during which a constituents of the second immiscible liquid passes into the first immiscible liquid and/or a constituents of the first immiscible liquid passes into the second immiscible liquid.

14. Method according to claim 13, in which said first immiscible liquid is molten aluminium and the second immiscible liquid comprises molten alkali metal salts containing aluminium fluoride or alkaline-earth metal fluoride salts containing aluminium fluoride, in which salts of one or more actinide fluorides and of one or more lanthanide fluorides are dissolved; and, during step c), said one or more actinide fluorides, by being in contact with the molten aluminium, are chemically reduced to said actinides, which pass into the first immiscible liquid, whereas the one or more lanthanide fluorides remain in the second immiscible liquid.

15. Method according to claim 14, in which, after step d), steps b) to d) are repeated by immersing said one or more first containers containing the molten aluminium and actinides in a volume of a third liquid consisting of molten alkali metal chlorides containing aluminium chloride or alkaline-earth metal chlorides containing aluminium chloride, by means of which the actinides, by being in contact with said third liquid, are chemically oxidized to actinide chlorides, which pass into the third liquid, and the molten aluminium is regenerated and optionally reused.

16. Method according to claim 1, in which step b) is carried out in a rough vacuum ranging from $2\times10^{-2}$ mbar to $10^{-1}$ mbar.

17. Method according to claim 1, in which step c) is carried out in an inert gas atmosphere.

18. Device for contacting a first and a second immiscible liquid, comprising:

one or more first containers intended to hold the first immiscible liquid and comprising side walls and a base, said side walls and said base being made of a solid material that is non-reactive with the first and second immiscible liquids, each said wall having one or more through-holes, the first immiscible liquid being non wetting vis à vis said solid material;

a second container intended to hold a volume of the second immiscible liquid; and means for supporting the one or more first container containing the first immiscible liquid so as to immerse the one or more first containers in said volume of the second immiscible liquid in the second container and, thereafter, to withdraw the one or more first containers from the volume of the second immiscible liquid in the second container, wherein said means for supporting said one or more first containers comprises a vertical rod having a bottom end, wherein an element supporting the one or more first containers is fixed to the bottom end of the vertical rod, and wherein said element supporting the one or more first containers is in the form of a circular carousel or barrel, the circular carousel or barrel having a central axis lying along an extension of said vertical rod and the circular carousel or barrel comprises, at the central axis, a piece projecting downwards beyond the base of said one or more first containers, said one or more first containers being arranged in a circle concentric with the central axis.

19. Device according to claim 18, in which said one or more first containers are made of a material chosen from graphite and boron nitride.

20. Device according to claim 18, in which said one or more first containers are cylinders of circular cross-section.

21. Device according to claim 20, in which the base of said one or more first container has a rounded geometry.

22. Device according to claim 18, in which said one or more through-holes have a cross-sectional shape chosen from circles and polygons.

23. Device according to claim 18, in which said one or more first containers are fixed to the element supporting the one or more first containers by a key or keys.

24. Device according to claim 22, wherein said polygons are squares or rectangles.

25. Device according to claim 24, wherein said polygons are rectangles.

26. Device according to claim 18, wherein said piece projecting downwards beyond the base of said one or more first containers has a cylindrical shape.

* * * * *